United States Patent [19]

Benner

[11] 4,359,599
[45] Nov. 16, 1982

[54] ELECTRICAL CONDUCTOR CONNECTION AND METHOD OF MAKING SAME

[75] Inventor: Henry F. Benner, Athens, Ga.

[73] Assignee: Westinghouse Electric Corp., Pittsburgh, Pa.

[21] Appl. No.: 121,074

[22] Filed: Feb. 13, 1980

[51] Int. Cl.³ .............................................. H01R 4/02
[52] U.S. Cl. .................................. 174/94 R; 219/127; 219/137 R; 228/165; 403/272
[58] Field of Search .................... 219/127, 137 R, 118; 74/94 R; 339/275 R; 403/271, 272; 228/165, 139

[56] References Cited

U.S. PATENT DOCUMENTS

| 1,290,091 | 1/1919 | Cole ................................. 219/127 X |
| 1,634,675 | 7/1927 | Mattice ................................ 219/127 |
| 4,163,869 | 8/1979 | Almand et al. .................... 174/94 R |

FOREIGN PATENT DOCUMENTS 215452  5/1924  United Kingdom ................ 219/127

Primary Examiner—Thomas J. Kozma
Attorney, Agent, or Firm—J. P. Hillman

[57] ABSTRACT

Two improvements to the electrical conductor connection disclosed in U.S. Pat. No. 4,163,869. The first is a new and improved process for forming by means of multiple timed MIG arc welding, an electrical connection between at least two lapped aluminum conductors, wherein neither conductor member has a pilot hole, thereby eliminating preforming and alignment requirements. The improved process produces the same full penetration weld with the same highly desirable substantially cylindrical weld nugget as the process of U.S. Pat. No. 4,163,869 with a preformed pilot hole does. The second improvement is a new and superior electrical conductor connection and a method of forming same between at least two lapped aluminum conductors. The connection so formed includes a weld nugget having a substantially rectangular cross-sectional configuration at the interface. The rectangular shape of the weld nugget at the interface increases the mechanical torque capacity and the electrical conductivity of the connection.

5 Claims, 13 Drawing Figures

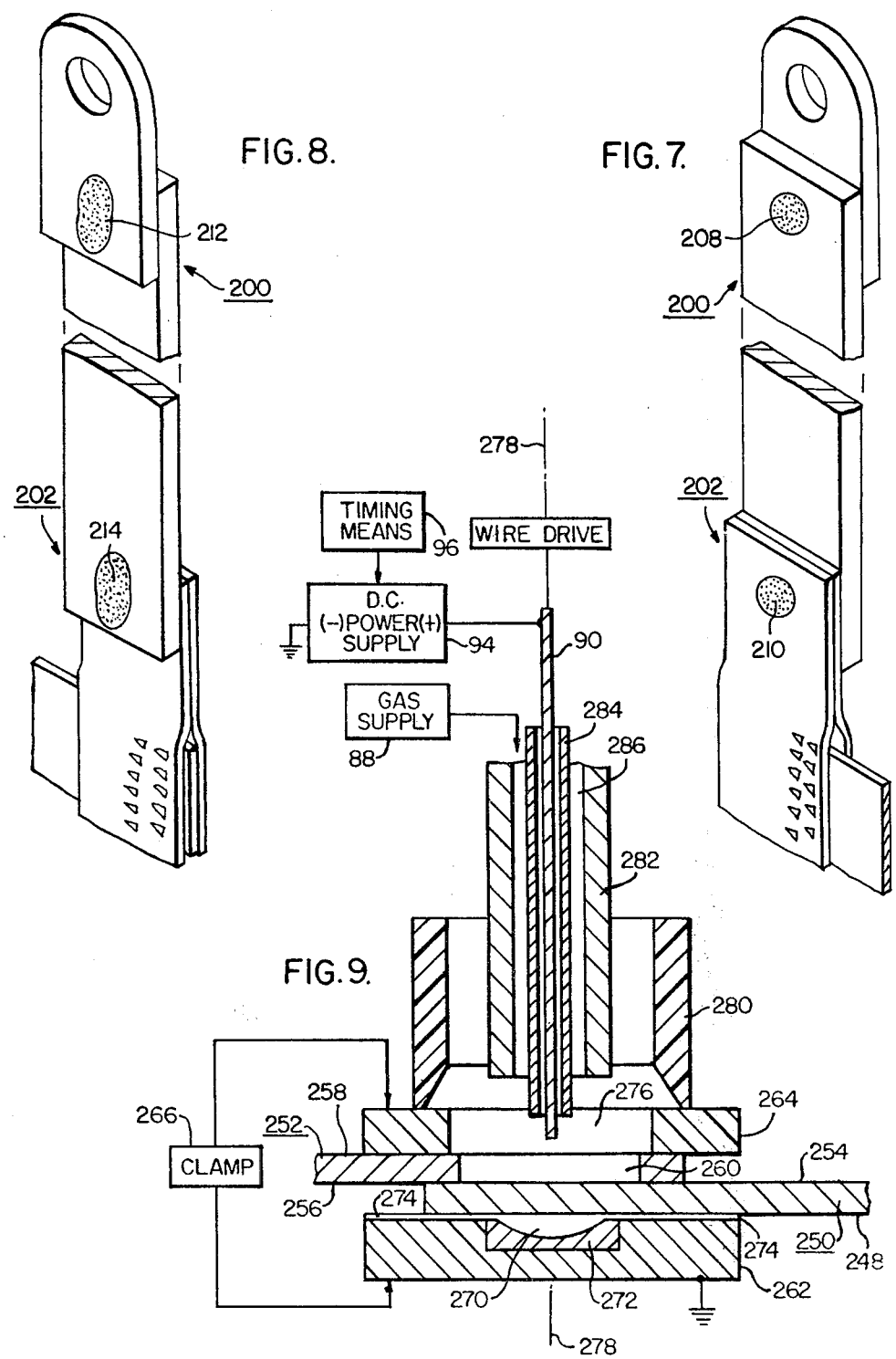

ELECTRICAL CONDUCTOR CONNECTION AND METHOD OF MAKING SAME

BACKGROUND OF THE INVENTION

1. Field of the Invention

This invention relates in general to the joining of aluminum conductors and in particular to MIG arc spot welding of aluminum conductors to form electrical conductor connections.

2. Description of the Prior Art

Aluminum has successfully replaced copper in a large number of electrical conductor applications. Whether or not aluminum may be used in a specific conductor application is usually dependent upon the availability of an economical and reliable electrical connection between conductor members, such as that disclosed in U.S. Pat. No. 4,163,869 entitled "Electrical Connection Between Aluminum Conductors", issued Aug. 7, 1979, and assigned to the same assignee as the present invention. While the methods and electrical conductor connections in this U.S. patent provide excellent electrical conductor joints, the present application discloses certain improvements to these methods and connections. The same parameters set forth in U.S. Pat. No. 4,163,869 also apply to the improvements, i.e., the joining technique must be applicable to production line techniques, it must be reliable and reproducible with minimum operator skill level, it must be economical and it must produce joints which may be visually inspected for joint integrity.

SUMMARY OF THE INVENTION

Briefly, the present invention includes two improvements to the invention disclosed in U.S. Pat. No. 4,163,869. The first is a new and improved process for making an electrical conductor connection between at least two lapped aluminum conductors. The second improvement discloses a new and improved electrical conductor connection between at least two aluminum conductor members, as well as a new process for making this new connection. Both improvements utilize the MIG arc welding process. Both improvements produce full penetration welds, in which the total quantity of weld metal is deposited in two or more timed sequence welds. In the first improvement, the pilot hole of U.S. Pat. No. 4,163,869 is dispensed with thereby eliminating preforming a hole, plus hole alignment requirements. With careful control of the welding parameters this improved process for multiple timed MIG arc welding provides the same full penetration weld with the same highly desirable substantially cylindrical weld nugget having at least a 0.375 inch (9.5 mm) dimension at the interface or throat between two conductors which have a thickness of 0.100 to 0.125 inch (2.54 to 3.2 mm) or greater. In the second improvement, a pilot hole is utilized in the first conductor, but now the pilot hole is elongated. The new process takes advantage of, and is adapted to the elongated hole by indexing the welding head, thereby achieving full fill of the elongated weld diameter (throat). The electrical conductor connection produced by this new process has a new and superior substantially rectangular cross-sectional configuration at the interface. The weld nugget has a length of approximately 0.75 (19 mm) inch and a width of approximately 0.375 (9.5 mm) inch at the interface.

The improved welding processes disclosed herein are applicable to out-of-position welds which may be made without sag or run of the molten weld pool.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIGS. 7 and 8 are fragmentary perspective views of rectangular aluminum electrical conductor connections made according to the teachings of the invention.

FIG. 9 is a cross-sectional view of MIG arc welding apparatus set up for forming an aluminum conductor connection by means of a slotted pilot hole according to the teachings of the invention.

DESCRIPTION OF THE PREFERRED EMBODIMENT

Inasmuch as the present invention constitutes improvements to the invention disclosed in U.S. Pat. No. 4,163,869, said Patent is hereby referred to and incorporated herein. Portions of U.S. Pat. No. 4,163,869 that are necessary for the full explanation of the present invention will be repeated in this description of the preferred embodiments, however any inadvertent omission or a more detailed description may be obtained by referring to the full text of that Patent.

Figure 1:
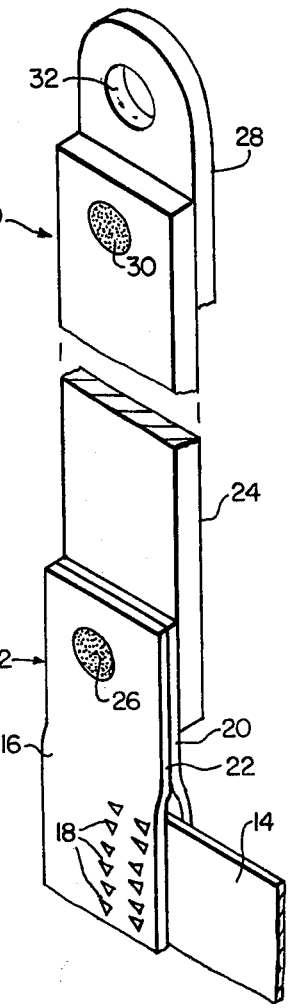
FIG. 1 is a fragmentary perspective view of aluminum electrical conductor connections made without the use of a pilot hole according to the teachings of the invention.

Referring now to the drawings and in particular to FIGS. 1, 7 and 8 there are shown fragmentary perspective views of aluminum electrical conductor connections 10, 12, 200 and 202 made according to the teachings of the invention. The weld nuggets 10 and 12 have the same highly desirable cylindrical cross-sectional configuration as the weld nuggets produced by the method disclosed in U.S. Pat. No. 4,163,869. The weld nuggets 200 and 202, formed as described later with the elongated pilot hole, have a superior rectangular cross section at the interface of the conductors.

Referring again to FIG. 1, the electrical conductor connections are illustrated relative to a strip or sheet conductor 14, which is part of a transformer coil or winding. A transformer application is illustrated because the present invention solved certain problems relative to joining aluminum parts to aluminum transformer windings. The invention, however, is broadly applicable to electrical conductor connections between at least two aluminum conductor members.

In the transformer application illustrated in FIG. 1, the sheet or strip conductor 14 is formed of soft aluminum, and an aluminum bi-fold or crimped terminal 16 is secured to the sheet conductor 14. Crimp terminal 16 is formed of hard aluminum plate, such as a plate formed of EC aluminum-1100H14 having a thickness of 0.0625 to 0.070 inch (1.59 to 1.78 mm), for example. The plate has a plurality of tangs 18 formed therein. The plate 16 is bent flat about the sheet or strip 14, with the tangs biting into the sheet 14 to provide a good joint, both electrically and mechanically. The tangs 18 bite through any oxide and/or other insulating film on the surface of the sheet 14, making it unnecessary to clean the sheet 14 prior to the joining step. Two superposed layers 20 and 22 of crimp terminal 16 which extend above the sheet conductor 14, form a first aluminum conductor which has a composite thickness of 0.125 inch to 0.140 inch (3.2 to 3.6 mm), for example, which is joined to a second aluminum conductor 24 via a fusion of aluminum or weld nugget 26, which forms the second electrical conductor connection 12. Electrical conductor 24 must be a flexible lead to facilitate assembly, and as such it is formed of dead soft aluminum strap such as EC aluminum-1100-0. Conductor 24 has a thickness of 0.102 to 0.156 (2.6 to 4.0 mm), for example. Since the connections at the bushing studs are bolted connections, and the soft aluminum lead 24 may creep under the pressure of a bolted connection, a third aluminum conductor or tab 28, formed of hard aluminum such as EC 1100H14, is joined to the soft aluminum conductor 24 via a fusion of aluminum or weld nugget 30, which forms the first electrical conductor connection 10. Tab 28, which may have a thickness of about 0.125 inch (3.2 mm), for example, has an aperture 32 therein for receiving a bushing stud.

A typical distribution type transformer has two low voltage windings formed of sheet aluminum, requiring four bi-fold crimp terminals, and thus when aluminum is used, as taught by the invention, a total of eight electrical conductor connections are required, in addition to the crimp terminal connections. The tab 28 may be joined to the lead 24 in a separate operation remote from the transformer assembly line, and the electrical conductor connection 10 may be formed with the conductors 24 and 28 oriented to use down-hand welding. The crimp terminal 16 however extends vertically upward from the transformer winding assembly. Thus, the winding assembly must be manipulated to orient the crimp terminals in the required position for down-hand welding, or the joining operation may be performed with the flat major opposed surface of the crimp terminal 16 and the lead 24 oriented in a vertical plane. It would be desirable to provide a joining process which is capable of providing elecrical conductor connection 12 with the conductors 16 and 24 oriented vertically, as viewed in FIG. 1.

A joining process for providing electrical conductor connections with the conductors in other than the down-hand position (out of position welds) without sag or run-out of the molten weld pool was disclosed in U.S. Pat. No. 4,163,869. The disclosd process included the application of MIG arc spot welding techniques to conventional plug welding methods wherein a pilot hole is pre-punched in one of the two members to be joined and the total welding time required to deposit sufficient metal to completely fill the desired weld area is obtained in multiple, short, timed welding increments, with timed delay periods between the welding increments, to allow solidification and some cooling of the deposited weld metal.

Figure 2:
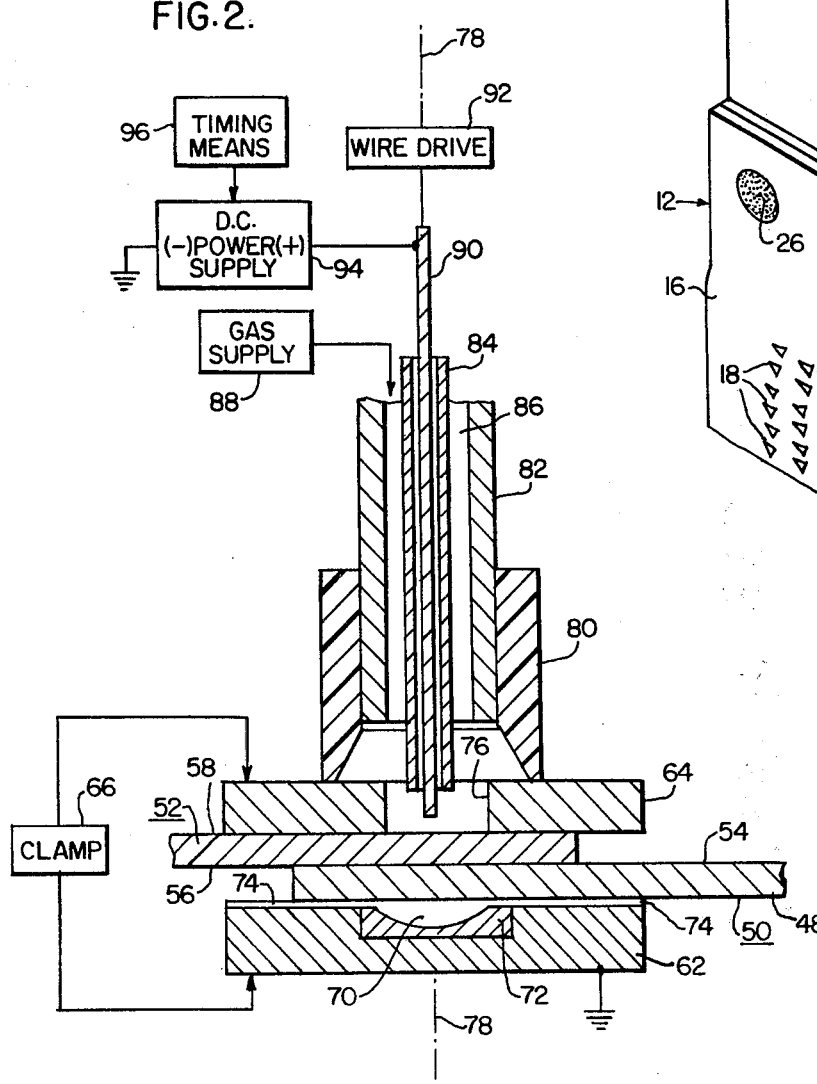
FIG. 2 is a cross-sectional view of MIG arc welding apparatus set up for forming the aluminum conductor joint without the use of a pilot hole according to the teachings of the invention.

FIG. 2 is a cross-sectional view of MIG arc welding apparatus used to perform a new and improved method of forming electrical conductor connections without the use of a pre-formed pilot hole according to the teachings of the invention. More specifically, first and second aluminum conductor members 50 and 52 to be joined are provided with the first aluminum conductor member 50 having first and second flat, major opposed surfaces 48 and 54, respectively, and with the second aluminum conductor member 52 having first and second flat major opposed surfaces 56 and 58, respectively. The first and second conductors 50 and 52 correspond to conductors 16 and 24 or to conductors 24 and 28 shown in FIG. 1. Neither the first nor the second conductor member 50 or 52 has a pilot hole formed therein since according to the teachings of the invention, this requirement has been eliminated. The first and second conductor members 50 and 52 are lapped, with the second major surface 54 of the first conductor 50 in contact with the first major surface 56 of the second conductor member 52.

The lapped conductors 50 and 52 are tightly clamped between first and second metallic clamp members 62 and 64, respectively, with a clamping means such as a pneumatically operated clamp arrangement, being illustrated generally at 66. The first clamp member 62 functions as a backup, and includes a recess 70 in its surface, which faces the first major surface 48 of the first conductor 50. As illustrated recess 70 may be formed in a replaceable copper or ceramic insert 72. Recess 70 forms the required weld button at the root end of the weld for easy visual inspection of joint integrity. Recess 70 is sized to provide the desired "button" size. For example recess 70 may have a diameter of about 0.5 inch (12.7 mm), and a depth of about 0.040 to 0.080 inch (1 mm to 2 mm). Good fill of this lower button was consistently achieved after the recess was vented by machining a plurality of grooves 74, which grooves start at the recess and radiate therefrom similar to the spokes of a wheel.

The upper clamp member 64 has an aperture 76 therein which is aligned with the center line of the recess 70. Notice that since a pilot hole is no longer required, an intermediate step of aligning a pilot hole with the aperture 76 and the recess 70 has been dispensed with. The lapped conductors 50 and 52 are simply placed between the first and second metallic clamp members 62 and 64 with the approximate location of the spot weld being located beneath the welding head. No critical alignments of the work pieces are necessary.

A tubular arc spot nozzle extension 80 is disposed with one of its open ends surrounding the aperture 76, and its other end is sized to snuggly receive a tubular MIG gun nozzle 82. A tubular contact tube 84, formed of copper or other suitable conductor material is disposed with its longitudinal axis on the center line 78, with the outside diameter of tube 84 being selected relative to the inside diameter of tube 82 to provide a space for flow of an inert shielding gas from a gas supply shown generally at 88. The inert shielding gas for example, may be helium, argon, or mixtures thereof.

A consumable electrode or welding wire 90 for the MIG welding process is directed through the opening in the contact tube 84 via a wire drive shown generally at 92. The wire 90 is aluminum welding wire which for example may be EC 1100 or 4043 aluminum havng an O.D. of 0.062 inch (1.6 mm), or other suitable diameter. The direct current power supply or welder 94 has its positive terminal connected to the wire 90, and its negative terminal is connected to ground to provide the reverse plurality configuration of MIG arc spot welding. The back up or bottom clamp member 62 is also connected to ground, to complete the electrical circuit. Suitable timing means, shown generally at 96, controls the length of the various weld-times, as well as the delay time between welds.

The conductors 50 and 52 are tightly clamped in position, and the flow of the inert gas is then initiated. The flow rate of the shielding gas is in the range of about 10 to 30 CFH. The wire 90 is inched forward until an arc strikes. A current sensor starts a timer when the arc is initiated which times the duration of the first weld. An open circuit voltage of 80 volts DC and an arc voltage of 24 volts DC has been found to be suitable. The welding current is in the range of 220 to 400 amperes, with the welding current averaging 350 amperes providing good results on the conductor sizes of the examples. A first weld time of 1.0 second has been found to be suitable when using three separate depositions of metal. A three-step deposition weld will be described as it was found to be very successful with the dimensions of the conductors hereinbefore specified, when making out-of-position welds. However, two steps, or more than three steps, may be utilized using different parameters. At the end of 1.0 second, the arc is extinguished and it is reinitiated after a delay of about 1.5 seconds. It is important to maintain the flow of the inert shielding gas at all times, even during the delay periods.

Figure 3:
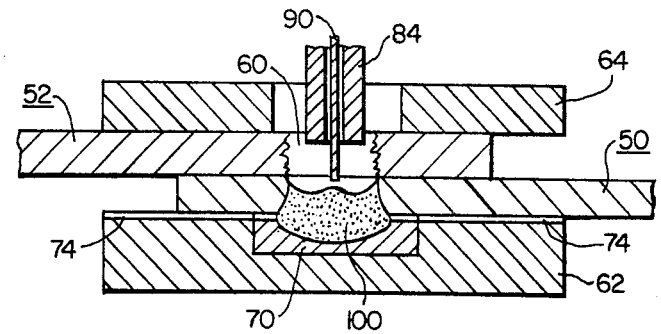
FIGS. 3, 4, and 5 are cross-sectional views illustrating additional steps in the method of forming aluminum conductor connections without the use of a pilot hole according to the teachings of the invention.
Figure 4:
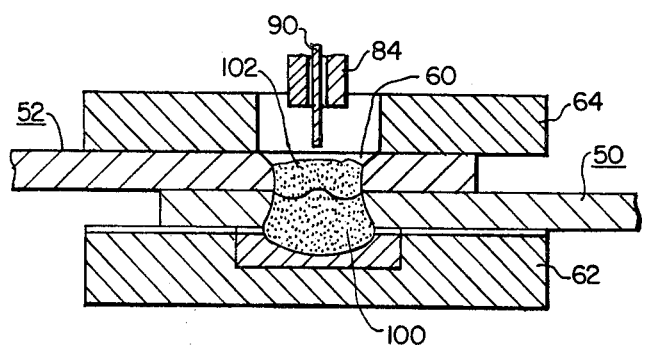
Figure 5:
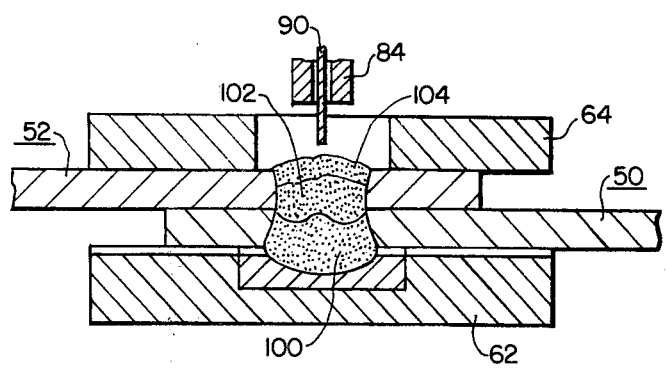
Figure 6:
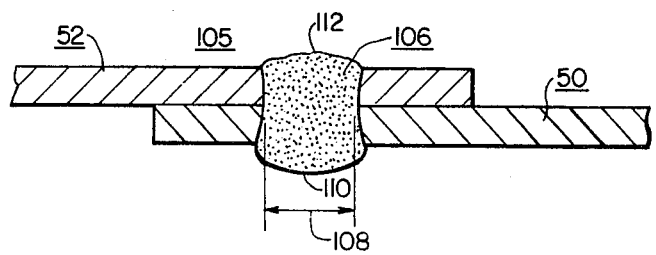
FIG. 6 is a cross-sectional view of an electrical conductor connection formed without the use of a pilot hole according to the teachings of the invention.

As illustrated in FIG. 3, the first welding step melts the metal of the second conductor 52, simultaneously the consumable electrode or welding wire 90 is advanced to the periphery of the molten metal 60 previously melted, and the extremely short length now causes the arc to displace the molten metal from the second conductor to the side thereby exposing the first conductor 50. The arc now melts the metal of the first conductor 50 and it, along with metal which has melted from the electrode 90 and residual metal left from the second conductor, runs into the recess 70 forming a weld pool 100 of molten aluminum. The grooves 74 allow gas to escape from the recess and enables the recess to consistently fill with aluminum without trapping air which forms voids or bubbles. After an initial weld time of about 1.0 seconds the arc is extinguished for about 1.5 seconds, which enables the weld pool 100 to partially solidify. The arc is then reinstated for about 0.6 seconds for the second welding step which melts the sides of the gouged out aperture 60 of the second conductor and it, along with metal from the consumable electrode 90, forms a weld puddle 102 which adds to the fusion of aluminum 100 already created in the first step. The addition of weld material 102 is shown in FIG. 4. The arc is again extinguished after the second weld period of about 0.6 seconds for a delay of about 1.5 seconds during which the weld pool 102 at least partially solidifies. The welding arc is re-established for about 0.6 seconds for the third welding step which adds additional aluminum 104 from the wire 90 to the fusion of aluminum weld material. This third step, shown in FIG. 5, fills the cylindrical central portion of the weld nugget and adds additional aluminum to the point of creating a convexly shaped weld button at the top of the weld having a diameter of about 0.625 inch (16 mm) and a crown or height above the second major surface 58 of conductor 52 of about 0.0624 inch (1.6 mm). A typical weld nugget 106 consumes about 15 inches (381 mm) of 0.062 inch (1.6 mm) O.D. aluminum welding wire. After a delay of about 2 seconds the parts are unclamped to provide the electrical conductor connection 105 having a weld nugget 106 which has substantially a cylindrical cross-sectional configuration, as shown in FIG. 6. The diameter or throat indicated at 108, of the weld nugget 106 is 0.375 inch (9.5 mm) minimum. The buttons 110 and 112 at the roof and top of the weld nugget 106, respectively, provide easy on-line inspectability. If the weld buttons are fully formed without voids the electrical conductor connection is good both electrically and mechanically.

The end results of the process described above is an electrical conductor connection having a weld nugget which has the same substantially cylindrical cross-sectional configuration as the nugget formed by the process disclosed in U.S. Pat. No. 4,163,869. The process according to the teachings of the present invention however enables the elimination of the pre-formed pilot hole in one of the conductors. This improved process has several advantages, among them (1) pre-drilling or punching of a pilot hole in one of the conductors is no longer required; (2) critical alignment of a pilot hole, the arc spot nozzle extension 80 and the recess 70 is not necessary; (3) the weld is produced with very little splatter. The molten metal from the gouged out aperture 60 is pushed to the side when the second conductor is being pierced through by the welding arc and eventually conglomerates in recess 70 with metal from the first conductor 50 and the electrode 90.

Referring now to FIGS. 7 and 8, there is shown a fragmentary, perspective view of the new and improved electrical conductor connections 200 and 202 made according to the teachings of the invention. The technique of this improvement includes a three-step welding procedure, the use of a slotted pilot hole, and the indexing of the welding head during the delay time intervals between welds. The weld nuggets produced have a rectangular cross section at the interface between the conductors, thereby increasing both the surface area and the volume of the weld nugget at the interface. FIG. 7 depicts the conventional weld buttons 208 and 210 formed on the root end of the conductor connections 200 and 202, respectively, and FIG. 8 shows the new rectangular weld buttons 212 and 214 that are formed on the top or crown end, respectively. Easy visual inspection of the integrity of the conductor connections 200 and 202, is thereby assured.

FIG. 9 is a cross-sectional view of MIG arc welding apparatus used to perform this new method of forming the electrical conductor connection, wherein first and second aluminum conductor members 250 and 252 to be joined are provided, with the first aluminum conductor member 250 having first and second flat, major opposed surfaces 248 and 254, respectively, and with the second aluminum conductor member 252 having first and second flat, major opposed surfaces 256 and 258, respectively. More specifically, first and second conductor members 250 and 252 are lapped with the second major surface 254 of the first conductor 250 in contact with the first major surface 256 of the second conductor member 252. The second conductor member 252 has an elongated pilot hole 260 formed therein. A pilot hole with dimensions of 3/16 inch radius at each end, a width of ⅜ to 5/16 inch and a length of ⅝ to ¾ inch produces excellent results, but other dimensions slightly smaller larger may be used. The elongated pilot hole 260 is positioned such that it is in the lapped portion of the first and second conductor members.

The lapped conductors 250 and 252 are tightly clamped between first and second metallic clamp members 262 and 264, respectively with a clamping means again being illustrated generally at 266. The first clamp member 262 functions as a backup and includes a recess 270 in its surface, which faces the first major surface 248 of the first conductor 250. Recess 270 forms the required weld button at the root end of the weld. Recess 270 may be formed in a replaceable copper or ceramic insert 272 and is selected to provide the desired button size. A 0.5 inch (12.9 mm) diameter and a depth of 0.04 to 0.08 inch (1 to 2 mm) has been used successfully in the preferred embodiment. The recess is not required to be elongated as the recess is only necessary to ensure complete penetration and to produce the required weld button for easy visual inspection of joint integrity. The reason it is not necessary for the recess to be elongated is an elongated root button would produce no additional beneficial results on the conductor connections. The only place on the weld nugget where the rectangular cross section is necessary and desirable is at the interface between the conductor members. Again the recess is vented by machining a plurality of grooves 274, which grooves start at the recess and radiate therefrom similar to the spokes of a wheel.

The second or upper clamp member 264 has an elongated aperture 276 therein, which faces the second major surface 258 of the second conductor 252 and which is sized somewhat larger than the elongated pilot hole 260 disposed therein. The centerlines of the aperture 276, pilot hole 260, and recess 270 are all aligned on a common axis or centerline 278 before being clamped together.

A tubular arc spot nozzle extension 280 has an elongated open end facing the second or upper clamp member 264 so as to cover the entire elongated aperture 276 so that the entire elongated aperture 276 and elongated pilot hole 260 can be shielded with an inert gas during the entire welding operation. The other end of the arc spot nozzle extension 280 is also elongated so that tubular MIG gun nozzle 282 can be indexed within the spot nozzle extension. A tubular contact tube 284 is again disposed on centerline 278 to provide a space 286 for flow of an inert shielding gas such as helium, argon or mixtures thereof from a gas supply as before.

The gas supply, DC power supply, timing means, wire drive, and consumable welding wire, being similar in description and operation to like components described for the welding apparatus of FIG. 2 will be given like reference numerals and will not be described again in detail. The flow rate of the shielding gas would again be in the range of about 10 to 30 CFH.

The consumable welding wire 90 is directed through the opening in the contact tube 284 and is inched forward until an arc strikes against the second flat major surface 254 of the first aluminum conductor member 250. A current sensor starts a timer when the arc is initiated, which times the duration of the first weld. An open circuit voltage of 80 volts DC and an arc voltage of 24.0 volts DC have been found to be suitable. The welding current is in the range of 220 to 400 amperes with a current averaging 220 to 380 amperes providing good results on the conductor sizes of the example.

A first weld time of 0.9 seconds has been found to be suitable when using three separate depositions of weld metal and two indexes. The number of indexes and weld depositions and the position of the indexed welding head may be varied depending on the length and shape of the weld nugget desired. Two indexes and three depositions of weld metal will be described as this method produced the elongated weld nugget used in the transformer winding application. Other variations of this process combined with different shaped pilot holes in one of the conductors will produce weld nuggets of various shapes that might be desirable for other applications. At the end of 0.9 seconds the arc is extinguished, the welding wire 90 is withdrawn, and the welding head is indexed to one side of the elongated pilot hole 260. Again it is important to maintain the flow of the inert shielding gas at all times, even during the delay periods.

Figure 10:
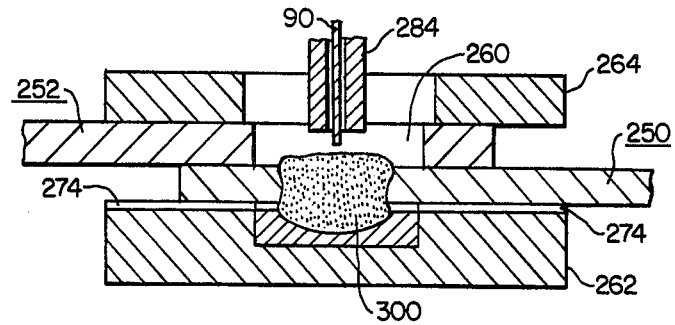
FIGS. 10, 11, and 12 are cross-sectional views illustrating additional steps in the method of forming an aluminum conductor connection by means of a slotted pilot hole according to the teachings of the invention.
Figure 11:
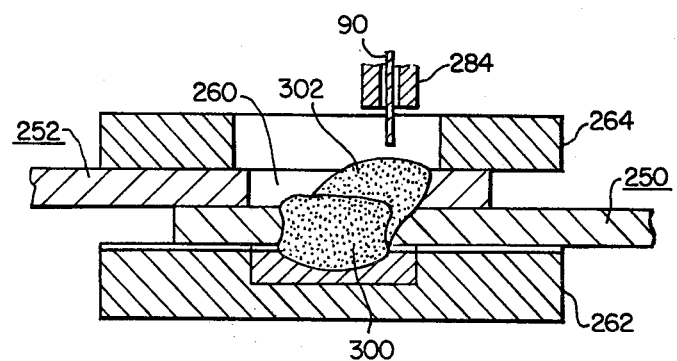
Figure 12:
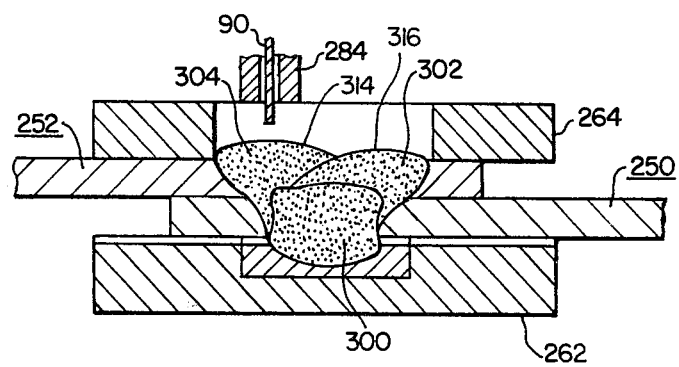

As illustrated in FIG. 10, the first welding step just described melts the metal of the first conductor 250 directly below the mid-point of the elongated pilot hole and it, along with metal which has melted from the electrode wire 90, runs into the recess 270 forming a weld pool 300 of molten aluminum. Recess 270 is also vented by a plurality of grooves 274 which allow gas to escape from the recess to enable the recess to consistently fill with molten aluminum without trapping air or other gases which can form voids or holes. After about 1.0 seconds, which enables the weld pool 300 to partially solidify, the arc, now in the first indexed position, is reinitiated for about 0.6 seconds. This second welding step melts the metal of the first conductor 250 which lies directly below the side of the pilot hole to which the welding head has been indexed. As shown in FIG. 11 during the duration of the second arc, the side of pilot hole 260 under the first indexed position is melted and it along with additional metal from the consumable electrode 90 is added to the molten metal of the first conductor to form weld pool 302 which adds to the fusion of aluminum 300 already created in the first step. After a second weld time of approximately 0.6 second the arc is interrupted, the consumable wire is retracted, and the welding head is indexed to the third position, i.e., the other side of the elongated pilot hole. After a delay of about 1.0 seconds during which the weld pool 302 at least partially solidifies, the welding arc is re-established for 0.6 seconds at the second indexed position. This third step of welding in the second indexed position is shown in FIG. 12. This third welding step melts the metal of the first conductor 250 which lies directly below the side of the pilot hole in the second indexed position. As shown in FIG. 12, during the duration of the third arc, the side of pilot hole 60 under the second indexed position, is melted and it along with additional metal from the consumable electrode 90 is added to the molten metal produced by the first and second steps to form weld pool 304 which adds to the fusion of aluminum 300 plus 302 created in the first and second steps to complete the filling of the pilot hole 260.

Weld pools 302 and 304 each have a convexly shaped weld button, 314 and 316 respectively, at the top of the weld having a diameter of about 0.625 inch (15.8 mm) and a crown or height above the second major surface 58 of conductor 52 of about 0.062 inch (1.58 mm). The two weld buttons 314 and 316 are fused together just as weld pools 302 and 304 are fused together to form substantially rectangular shaped weld button 318 having a width of about 0.625 inch (15.8 mm), a length of about 1 inch (25.4 mm) and a crown or height of about 0.062 inch (1.58 mm). A typical weld nugget consumes about 15 inches (381 mm) of 0.062 inch (1.6 mm) aluminum welding wire.

Figure 13:
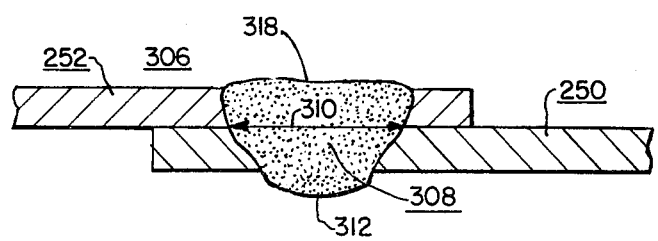
FIG. 13 is a cross-sectional view of an aluminum electrical conductor connection which includes a weld nugget having a substantially rectangular cross section at the interface of the conductors according to the teachings of the invention.

After a delay of approximately 2 seconds, the parts are unclamped to provide the electrical conductor connection 306 having a fusion of aluminum or weld nugget 308 which has a substantially rectangular cross-sectional configuration at the interface as shown in FIG. 13. The rectangular throat, indicated at 310, has a length of approximately 0.75 inch (19 mm) and a width of approximately 0.375 inch (8.5 mm) at the interface (the critical portion of the connection) between the two aluminum conductors. The sides of the connecting central portion of the fusion of aluminum extend substantially perpendicular between the first and second major flat surfaces 256 and 258 respectively of the second aluminum conductor member 252 to define substantially rectangular shaped end portion weld button 318, formed by the fusion of the weld pools 302 and 304. The sides of the connecting central portion of the fusion of aluminum extend substantially conically between the first and second major flat surfaces 248 and 254 respectively of the first aluminum conductor member 250 to define a substantially circular shaped end portion weld button 312 formed by weld pool 300. The buttons 312, and 318 at the root and top, respectively, of the weld nugget 308 again provide easy on-line inspectability. If the weld buttons are fully formed without voids, the electrical conductor connection is good both electrically and mechanically.

The multiple-timed and sequenced MIG arc welding as well as the multiple-timed, sequenced and indexed MIG arc welding described herein may also be successfully applied to out-of-position welds, i.e. the conductors may be oriented in other than the horizontal plane. The multiple deposition of welding material with delays for cooling the weld puddle provides the desired weld nugget without sag or run of the weld pool. The Figures may be reoriented to illustrate out-of-position welding according to the teachings of the invention.

In summary there has been disclosed new and improved processes and electrical conductor connections. The first improvement is a new and improved method for producing an electrical conductor connection which is mechanically and electrically similar to that disclosed in U.S. Pat. No. 4,163,869, while eliminating the requirement of a pilot hole. Another improvement, a new and improved electrical conductor connection and a process of making same, provides a weld nugget having a substantially rectangular cross-sectional configuration at the interface between the conductors. The elongated rectangular weld nugget is superior both mechanically and electrically to a cylindrically configured weld nugget. This improved connection has increased surface area and volume of the weld nugget at the interface (the critical portion) of the aluminum conductors. The rectangular shape of the weld nugget at the interface increases the torque the connection can withstand without mechanical failure. This arrangement also increases the conductivity of the electrical connection between the two conductors due to the increased surface area of the connection at the interface.

I claim as my invention:

1. An electrical conductor connection comprising:
   first and second aluminum conductor members each having first and second major opposed flat surfaces;
   said first and second aluminum conductor members being lapped with at least a portion of their second and first major flat surfaces, respectively, in contact with one another;
   and a fusion of aluminum joining said lapped first and second aluminum conductor members;
   said fusion of aluminum having a connection central portion fused to both said first and second aluminum conductor members, and first and second end portions;
   said first and second end portions being convexly cupped and extending outwardly past the first and second major flat surfaces of the first and second aluminum conductor members, respectively;
   said connecting central portion of the fusion of aluminum having a substantially rectangular configuration at the interface of the second and first major opposed flat surfaces of the first and second aluminum conductor members, respectively, wherein the sides of the connecting central portion of the fusion of aluminum extend between the first and second major opposed flat surfaces of the second aluminum conductor member to define a substantially rectangular shaped end portion such that a plane intermediate and parallel to said major opposed flat surfaces intersects a substantially rectangular shaped perimeter of the connecting central portion of the fusion of aluminum, and wherein the sides of the connecting central portion of the fusion of aluminum extend substantially conically between the second and first major flat opposed surfaces of the first aluminum conductor member to define a substantially circular shaped end portion such that multiple planes intermediate and parallel to said major opposed flat surfaces intersect at first substantially elliptical and then substantially circular shaped perimeters of decreasing diameters of the connecting central portion of the fusion of aluminum, proceeding in a direction away from the interface of said second and first major opposed flat surfaces of the first and second aluminum conductor members.

2. The electrical conductor connection of claim 1 wherein the rectangular shaped fusion of aluminum at the interface between the first and second aluminum conductor members and throughout the second aluminum conductor has a width of at least 0.375 inch and a length of at least 0.75 inch, and the conical shaped fusion of aluminum through the first aluminum conductor decreases to a diameter of at least 0.375 inch at the first end portion.

3. The electrical conductor connection of claim 1 wherein the first conductor member is an aluminum bi-fold crimp terminal, and the second conductor is formed of soft aluminum to provide a flexible lead, and including a third conductor member formed of hard aluminum, said third conductor member being lapped with the second conductor member, and a second fusion of aluminum joining the lapped second and third conductor members, said second fusion of aluminum being similar in configuration to the fusion of aluminum joining the lapped first and second conductor members.

4. The electrical conductor connection of claim 3 wherein the thickness dimension of each of the first, second and third conductor members is at least 0.100 inch.

5. An electrical conductor connection between first and second lapped aluminum members, prepared by a process comprising the steps of:

providing a backup member against the first aluminum member, with the backup member having a recess in its surface facing the lapped portion of the first aluminum member;

providing an elongated aperture in the second aluminum member;

clamping the first and second aluminum members together with the aperture aligned with the recess;

shielding the aperture with an inert gas;

advancing an aluminum consumable welding electrode to a predetermined first position within the aperture;

striking a first arc against the first aluminum member to cause a portion of the first aluminum member to melt and enter the recess;

and filling the aperture with metal from the aluminum consumable electrode, with said filling step including the steps of extinguishing the first arc, indexing the welding electrode to a second position and striking a second arc after a predetermined time delay, extinguishing the second arc, indexing the welding electrode to a third position and after a predetermined delay striking a third arc, to provide a weld nugget having a substantially rectangular configuration at the interface of the aluminum members and through one of the aluminum members, and a substantially conical configuration of decreasing diameter through the other of the aluminum members, and having first and second cupped ends which extend outwardly past the first and second aluminum members, respectively.

* * * * *